Nov. 24, 1964      G. R. DONALDSON      3,158,020
POROSIMETER
Filed June 14, 1961
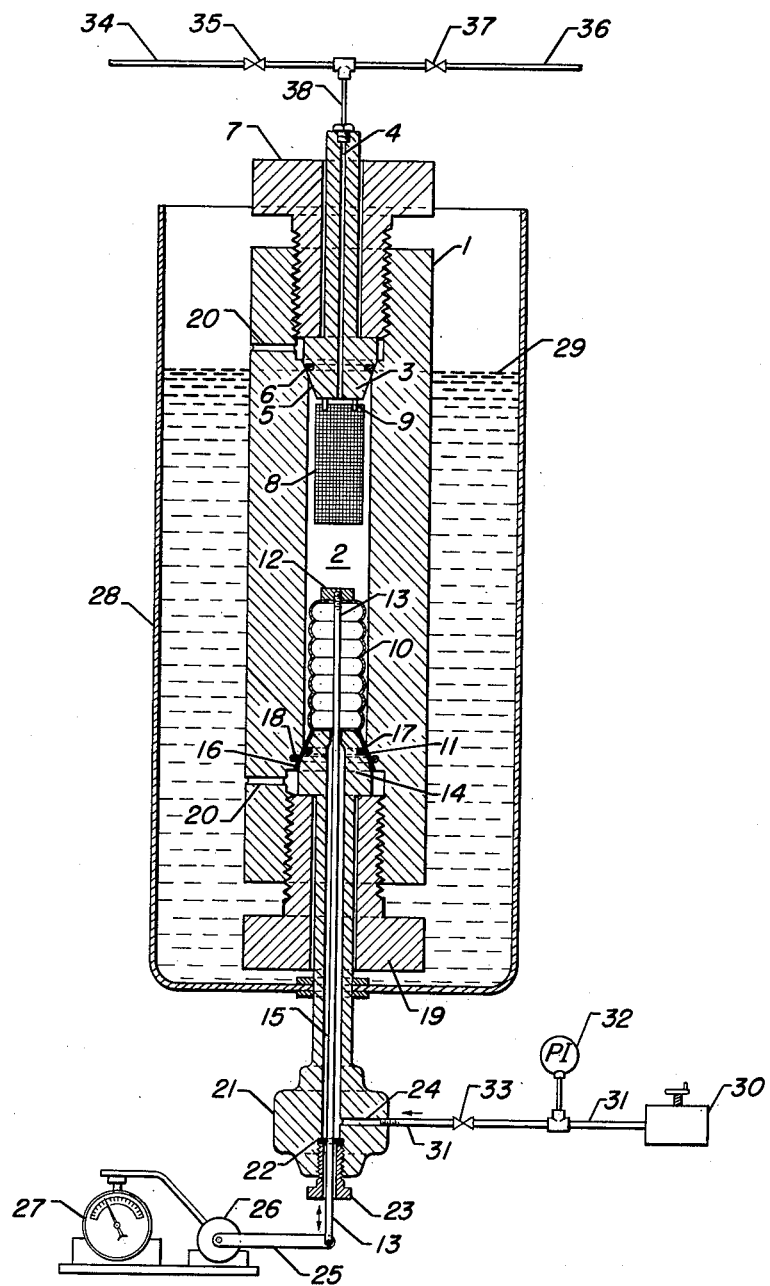
INVENTOR:
George R. Donaldson
BY: Chester J. Giuliani
Philip T. Liggett
ATTORNEYS United States Patent Office 3,158,020
Patented Nov. 24, 1964

3,158,020
POROSIMETER
George R. Donaldson, Barrington, Ill., assignor to Universal Oil Products Company, Des Plaines, Ill., a corporation of Delaware
Filed June 14, 1961, Ser. No. 117,033
7 Claims. (Cl. 73—38)

This invention relates to apparatus for the determination of pore volume distribution of porous solids utilizing the hydraulic penetration technique. More particularly, this invention is directed to an improved mercruy porosimeter designed for operation at pressures ranging from substantially zero p.s.i.a. up to 100,000 p.s.i.g.

The determination of pore volume and pore volume spectra by liquid intrusion is a well known analytical method and need be only briefly described here. In this technique a sample of porous solid is immersed in a liquid which is selected so as to be substantially "non-wetting" with respect to the solid, that is, the angle of contact is large and there is a repulsion of the liquid from the surface of the solid. In order for liquid to enter a pore of a given diameter, a certain minimum pressure must be applied to the system; this pressure is a function of pore diameter, surface tension of the liquid, and angle of contact and can be calculated according to known mathematical formulas. The minimum diameter of a pore which can be filled with liquid is approximately inversely proportional to the logarithm of the applied pressure, all other variables being held constant; therefore, the higher the pressure the smaller the diameter of pore which is filled. As pressure is incrementally increased, the corresponding decrease in volume of the solid-liquid system represents the total pore volume of all pores having diameters between the penetratable minimums correlative with the preceding lower pressure and the next higher pressure. By correlating change in volume with change in pressure at several pressure levels, the complete distribution of pore volume as a function of pore diameter may be obtained. Mercury is almost universally prefererd as the penetration liquid because of its high negative capillarity with respect to solids, although other liquids such as carbon tetrachloride and ethylenedibromide have occasionally been employed in this work. Liquids having low surface tension and small contact angle are unsatisfactory for measurement of large diameter pores since these are readily filled at very low pressures which are difficult to measure. Heretofore the utility of mercury porosimetry has been largely limited to determining the volume of macropores, that is, pores having diameters ranging from about 100,000 A. down to about 1200 A., at corresponding pressures ranging from slightly above atmospheric to about 1500 p.s.i.g.

While pores of smaller diameter can be investigated by resort to higher pressures, the heavy pressure equipment heretofore developed therefor has been considered too expensive, cumbersome and inaccurate to permit use in routine analyses of micropore structures. For example, one common type of porosimeter employs a calibrated glass capillary tube disposed within an armored gauge glass, the mercury-pressuring fluid meniscus within the capillary being observed visually. The maximum pressure utilizable here is severely limited by the strength of the gauge glass, and the glass panel itself is quite expensive to replace should it become broken.

In consequence of the limitations of prior art apparatus, the investigation of micropore structure is usually done by the nitrogen adsorption method, which is satisfactory for pore diameters within the range of from about 20 A. to about 600 A.

It is an object of the present invention to provide a versatile, extended range liquid porosimeter capable of determining volumes of pores having diameters within the range of from about 150,000 A. to about 50 A.

In a broad embodiment, this invention relates to apparatus for determining the pore volume spectrum of a porous solid which comprises in combination a fluid-tight chamber defined by a substantially rigid casing and a single resiliently deformable wall section, a shaft connected to said deformable wall section extending exteriorly from said chamber, means for inserting a sample of porous solid into said chamber, means for filling said chamber with a liquid, and means for subjecting the exterior surface of said deformable wall section to contact with a fluid under adjustable pressure.

A more specific embodiment of this invention is directed to a porosimeter comprising in combination a fluid-tight chamber defined by a substantially rigid longitudinal casing and a pair of end closure members, one of said end closure members comprising a removable sealing member and the other of said end closure members comprising an elastic bellows disposed within said chamber and free to expand inwardly thereof, a bellows seating member maintaining the fixed end of said bellows in fluid-tight contact with said casing, a passageway extending through said seating member communicating at one end thereof with the interior of the bellows and being provided at the other end with a shaft seal, a shaft of smaller diameter than said passageway connected to the free end of said bellows and extending through said passageway and said shaft seal, a fluid supply conduit communicating with said passageway, and valved conduit means communicating with the interior of said chamber.

The structure and operation of this invention may best be described in conjunction with the accompanying drawing which is presented as illustrative of the best mode of practicing the invention but not with the intention of unduly limiting its broad scope. Obvious modifications and substitution of equivalent elements in the specific apparatus illustrated will be readily apparent to those skilled in the art.

With reference now to the drawing, there is shown a sectional elevation view of the present porosimeter. A thick-walled cylindrical casing 1 having a hollow interior 2 of limited valume is sealed at its upper end by a conically tipped head 3 which in turn is urged into fluid-tight contact with casing 1 by threaded compression collar 7. An O-ring 6 is fitted into conical surface 5 of head 3 to provide additional sealing effect. A passageway 4 for vacuum evacuation and mercury filling is drilled through head 3. A sample container 8, which may be a wire basket or other type of perforated shell member suitable for retaining the porous solid as a confined mass in open communication with space 2, is removably attached to head 3 by means of clips 9. Casing 1 is sealed at its lower end by an elastic, expansible bellows 10 disposed within space 2 and having a diameter slightly smaller than the internal diameter of casing 1. The lower fixed end 11 of bellows 10 is flared outwardly to conform with the beveled wall of casing 1 at that point, and the upper free end of bellows 10 is fitted to a cap plate 12. A threaded compression collar 19 bears upwardly against conically tipped head 14 which in turn urges flared end 11 of bellows 10 into fluid-tight contact with casing 1. An O-ring 17 in conical surface 16 of head 14 and an O-ring 18 in the adjacent beveled wall of casing 1 provide further sealing effect. Upper and lower bleed ports 20 are cut through the wall of casing 1 to protect against possible pressure build-up in and around upper head 3 and lower head 14. The lower elongated extension of head 14 terminates in a T-fitting 21, and a passageway 15 is drilled the length of head 14, communicating at its upper end with the sealed interior of bellows 10. A shaft 13, having a smaller diameter than passageway 15, is connected at its upper end to bellows cap plate 12, and shaft 13 extends downwardly through the length of passageway 15 to the exterior of T-fitting 21. A hydraulic seal formed by O-ring 22 and compression nut 23 seals the exit of shaft 13 from T-fitting 21 while permitting free longitudinal movement of the shaft. A fluid supply passageway 24 formed in T-fitting 21 communicates with passageway 15.

Casing 1 is immersed in a constant temperature bath 29 contained in tank 28. Any suitable means for controlling bath temperature may be employed (not shown) such as an immersion heater and a paddle stirrer; alternatively, in lieu of a constant temperature bath, casing 1 may be wrapped with an adiabatic lagging and a differential temperature controller connected thereacross. A third means of maintaining the apparatus at a constant temperature is to enclose the entire apparatus in a hot box in which a stream of air at controlled temperature is circulated, the temperature control being provided by a thermostatically controlled electric heating element, heat exchanger, or other means; such arrangement has the advantage of surrounding the entire apparatus, including collars 7 and 19, with a constant temperature medium, thereby minimizing heat flow through collars 7 and 19.

The lower end of shaft 13 is connected via linkage 25 and pivot 26 to a dial micrometer 27. A pressure generator 30 is connected via line 31 and valve 33 to passageway 24, and a pressure gauge 32 is T'd into line 31. The pressure generator may be a hand-powered hydraulic piston, as illustrated, or a motor-driven high pressure pump, or a controllable source of compressed gas. The hydraulic fluid may be a hydrocarbon oil, an alcohol, or any other suitable liquid or gas.

The operation of the apparatus is as follows: head 3 and sample container 8 are removed, a weighed sample of porous solid is placed in container 8, and these parts are then reassembled and tightened up. A line 38 is connected to passageway 4 which in turn connects, alternatively, through line 34 and valve 35 to a reservoir of mercury (not shown), and through line 36 and valve 37 to a vacuum pump (not shown). With valve 35 closed and valve 37 open, the sample and hollow interior of casing 1 are evacuated of air, water vapor, and other fluid contaminants which may have accumulated within space 2 or have become absorbed within the pores of the sample. Valve 37 is then closed and valve 35 opened, admitting mercury into space 2; when space 2 is completely filled with mercury, valve 35 is closed. The filled and sealed apparatus is then allowed to reach the controlled temperature before the test is commenced.

Hydraulic fluid prom pressure source 30 flows through passageways 24 and 15 into the interior of bellows 10, causing the bellows to expand inwardly into space 2, subjecting the mercury in space 2 to the same pressure as that of the hydraulic fluid, and forcing mercury into the pores of the solid sample. As the bellows expands, shaft 13 moves upwardly and its displacement is registered by dial micrometer 27. After the test is completed, the apparatus may be depressured and the mercury may then be removed to the level of the bottom of cone 3 by aspirating mercury from passageway 4 before the collar 7 is loosened and removed.

This same apparatus may be utilized for studies at subatmospheric pressures, i.e., at pressures as low as substantially zero p.s.i.a., by means of a simple variation in the mercury filling technique. The mercury reservoir tank is vented to the atmosphere and placed at a suitable lower elevation than the porosimeter itself, the bottom of the mercury reservoir being connected to conduit 34 as before. After the sample of porous solid loaded into space 2 and the chamber has been evacuated to substantially zero p.s.i.a., valve 37 is closed and valve 35 is opened, and atmospheric pressure acting upon the mercury level within the reservoir forces the mercury to flow upwardly through line 34 into space 2. When space 2 and passageway 4 are filled with mercury, the absolute pressure existing at the top of passageway 4 is less than atmospheric by the amount equivalent to the height of mercury column in the filling leg, e.g., the difference in elevation between the reservoir level and the top of passageway 4; this absolute pressure may be made substantially zero provided the height of the vertical filling leg equals or exceeds the existing atmospheric pressure as measured in units of length of mercury. Under these conditions, the test run starting pressure acting upon the sample of porous solid is only greater than zero p.s.i.a. by the height of mercury contained in passageway 4, which need be only a few centimeters in length. It will be appreciated that the instant invention is well suited for very low pressure studies as well as high pressure work, and accomplishes in a single unitary apparatus those functions which heretofore have required two separate porosimeter assemblies, one for subatmospheric pressure and the other for superatmospheric pressure.

Materials of construction may be steel, stainless steel or any other metal having the requisite yield strength, and those parts of the equipment which contact mercury should, of course, not amalgamate therewith; any of the 300 series stainless steels are suitable as construction materials for the casing, heads, and sample container for pressures up to about 30,000 p.s.i.; for higher pressures up to 100,000 p.s.i., it is preferred to use a 400 series stainless steel which is hardenable and has a higher yield strength. Since the bellows is subject to very little differential pressure (a maximum of 15 p.s.i. during evacuation) it may be fabricated of suitably thin metal, i.e., 304 or 316 stainless steel, with foremost regard in the design thereof being given to meeting deflection specifications.

The interior 2 of casing 1 is preferably formed as small as practicable to permit minimum inventory of mercury therein. This is because the compressibility of mercury must be taken into account at the higher pressures, and while the decrease in volume chargeable to compression of the mercury can be calibrated out, the less volume there is to contend with, the less chance for experimental error in any event. The diameter of bellows 10 is therefore made just slightly smaller than the diameter of space 2, and the bellows when fully longitudinally expanded approaches closely, but does not quite contact, sample container 8. Where the measured pore volumes are small and only limited travel of shaft 13 is required, a deflectable diaphragm may be substituted for the bellows member.

Because shaft 13 is of small diameter, it is easy to seal against high fluid pressures. If desired, a weighted wire may be used instead of a rigid shaft for this purpose, and such variation is encompassed within the definition of the term "shaft" as herein employed in the specification and in the appended claims. However, a small rate of leakage around shaft seal 22 may be tolerated without difficulty since pressure source 30 will be able to provide additional pressuring fluid as required.

Although passageway 4 is shown as extending through removable head 3, it will be appreciated that this passageway may instead be drilled through the longitudinal wall of the casing itself. The apparatus is preferably vertically oriented, as illustrated, in order to aid in filling with mercury; however, it is not essential that it be operated vertically, but it may be operated in a horizontal position, or obliquely to the vertical, or completely inverted, as desired.

The pressure gauge and dial micrometer represent the simplest means of measuring chamber pressure and shaft displacement, respectively, and these instruments will suffice for most routine analytical work. A standard micrometer can respond, reproducibly, to differential displacements of the order of 0.0005 inch, and the present porosimeter may readily be sized to provide a total shaft displacement of 1–1½ inches over an applied pressure range of 0–25,000 p.s.i. Ordinarily two or more manifolded pressure gauges having varying pressure ranges will be employed instead of the single gauge illustrated in order to assure high accuracy at all pressure levels. The pressure-measuring instrument should, of course, be connected to the pressuring fluid side of the bellows and not to the mercury side thereof because the measuring element itself undergoes appreciable volume change which would introduce substantial error into the overall measurement if the gaugew ere directly connected to space 2 of casing 1. Obviously, more elaborate instrumentation may be utilized if desired. For example, an optical deflectometer may be used for detecting shaft displacement changes of the order of $10^{-5}$ inches, and a suppressed range, narrow span pressure transducer may be employed instead of the conventional full range indicating gauge. One of the advantages of the present invention is that it provides a continuous analog indication (shaft displacement) of the pore volume filled, and therefore is readily adapted for use with automatic curve-drawing devices. For example, in a more refined version of this invention, an electronic displacement sensor is activated by differential transformer means magnetically coupled to shaft 13, an electronic pressure transducer is connected to the pressuring fluid supply line, and the output signals of these transducers are then fed to an X–Y recorder. The pressure output of pressure generator 30 is increased at a slow but steady rate which may be provided by a programmed rate-of-rise controller, and a pressure versus volume curve is automatically plotted by the X–Y recorder.

In a typical laboratory application involving daily a large number of pore volume determinations, it will be advantageous to utilize a plurality of porosimeters connected in parallel, with the pressuring fluid to all of them being supplied from a common pressure source.

Although the present apparatus is designed primarily for use with mercury, it is contemplated that other penetration liquids such as carbon tetrachloride may be used therein at the option of the user.

The uncomplicated construction of this invention results in ease of manufacture and assembly, low first cost, and low maintenance expense. The bellows member and the several mechanical seals are the only elements subject to wear and tear, and these are easily and quickly replaced with ordinary tools. The hazard and expense of a glass viewing panel is eliminated, together with the very restrictive pressure limitations commonly associated with such type of apparatus, while an accurate, reproducible means of determining volume changes is provided by the bellows-shaft combination.

I claim as my invention:

1. Apparatus for determining the pore volume distribution of a porous solid which comprises in combination a fluid-tight chamber defined by a substantially rigid longitudinal casing and a pair of end closure members, one of said end closure members comprising a removable sealing member, and the other of said end closure members comprising a bellows which is expandable inwardly of the chamber, a shaft connected to the free end of the bellows and extending through the bellows to the exterior of said chamber, valved conduit means communicating with the interior of said chamber, means for introducing a fluid under pressure to the interior of said bellows, means for varying the pressure of said fluid, means coupled to said shaft outside the chamber for measuring shaft displacement, and means for measuring the pressure within the chamber.

2. The apparatus of claim 1 further characterized in that a perforate sample container is disposed within said chamber and is connected to said removable sealing member.

3. The apparatus of claim 1 further characterized in that a passageway extends through said removable sealing member, said valved conduit means connecting with said passageway.

4. Apparatus for determining the pore volume distribution of a porous solid which comprises in combination a fluid-tight chamber defined by a substantially rigid longitudinal casing and a pair of end closure members, one of said end closure members comprising a removable sealing member and the other of said end closure members comprising an elastic bellows disposed within said chamber and free to expand inwardly thereof, a bellows seating member maintaining the fixed end of said bellows in fluid-tight contact with said casing, a passageway extending through said seating member communicating at one end thereof with the interior of the bellows and being provided at the other end with a shaft seal, a shaft of smaller diameter than said passageway connected to the free end of said bellows and extending through said passageway and said shaft seal to the exterior of said chamber, means coupled to said shaft outside the chamber for measuring the displacement of the shaft, a fluid supply conduit communicating with said passageway, and valved conduit means communicating with the interior of said chamber.

5. Apparatus for determining the pore volume distribution of a porous solid which comprises in combination a fluid-tight chamber defined by a substantially rigid longitudinal casing and a pair of end closure members, one of said end closure members comprising a removable rigid sealing member and the other of said end closure members comprising an elastic bellows disposed within said chamber and free to expand inwardly thereof, a bellows seating member maintaining the fixed end of said bellows in fluid-tight contact with said casing, a perforate sample container disposed within said chamber and connected to said removable sealing member, a passageway extending through said bellows seating member communicating at one end thereof with the interior of said bellows and being provided at the other end with a shaft seal, a shaft of smaller diameter than said passageway connected to the free end of said bellows and extending through said passageway and said shaft seal to the exterior of said chamber, means coupled to said shaft outside the chamber for measuring the displacement of the shaft, a fluid supply conduit communicating with said passageway, and valved conduit means communicating with the interior of said chamber.

6. Apparatus for determining the pore volume distribution of a porous solid which comprises in combination a fluid-tight chamber defined by a substantially rigid longitudinal casing and a pair of end closure members, one of said end closure members comprising a removable rigid sealing member and the other of said end closure members comprising an elastic bellows disposed within said chamber and free to expand inwardly thereof, a bellows seating member maintaining the fixed end of said bellows in fluid-tight contact with said casing, a perforate sample container disposed within said chamber and connected to said removable sealing member, a passageway extending through said bellows seating member communicating at one end thereof with the interior of said bellows and being provided at the other end with a shaft seal, a shaft of smaller diameter than said passageway connected to the free end of said bellows and extending through said passageway and said shaft seal to the exterior of said chamber, means coupled to said shaft outside the chamber for measuring the displacement of the shaft, a fluid supply conduit communicating with said passageway, valved conduit means communicating with the interior of said chamber, and pressure sensing means responsive to chamber pressure.

7. Apparatus for determining the pore volume distribution of a porous solid which comprises in combination a fluid-tight chamber, a perforate sample container for said porous solid in one end portion of the chamber, an elastic bellows sealing the other end of the chamber and expansible within the chamber toward the sample container, a shaft connected to the free end of said bellows and extending through the bellows to the exterior of said chamber, means for filling the chamber with a liquid, means for introducing a fluid under pressure to the interior of said bellows, means for varying the pressure of said fluid, and means coupled to said shaft outside the chamber for measuring the displacement of the shaft.

References Cited in the file of this patent

UNITED STATES PATENTS

| | | |
|---|---|---|
| 2,296,852 | Horner | Sept. 29, 1942 |
| 2,604,779 | Purcell | July 29, 1952 |
| 2,662,393 | Rzasa | Dec. 15, 1953 |
| 2,692,497 | Van Nordstrand | Oct. 26, 1954 |
| 2,957,334 | Essmann | Oct. 25, 1960 |

FOREIGN PATENTS

| | | |
|---|---|---|
| 973,471 | Germany | Mar. 3, 1960 |